United States Patent Office 3,579,619
Patented May 18, 1971

3,579,619
ROASTING MARL TO PRODUCE A POZZOLANA MATERIAL
Dietrich Harkort, Am Schwalbenschwanz 56; and Rudolf Rasch, Georg-Speyer-Strasse 86, both of 6 Frankfurt am Main, Germany; Rolf Iberg, Chapfstrasse 19, CH–8142 Uitikon, Switzerland; and Jurg H. Heberlein, Rohrhaldenstrasse 41, CH–8712 Stafa, Switzerland
No Drawing. Filed Aug. 23, 1968, Ser. No. 754,993
Claims priority, application Germany, Aug. 25, 1967,
B 94,148
Int. Cl. C04b 7/12, 7/44
U.S. Cl. 264—42                2 Claims

ABSTRACT OF THE DISCLOSURE

Construction materials of high strength and low volumetric weight are formed by hardening in an autoclave at about 165° and at an atmospheric pressure and for a time such that the multiplicand equals about 65 atmosphere hours a thermally active earth mixed with water. The earth or "washed clay" is a mineral substance or marl comprising by weight calcium carbonate (10–30%), clay minerals (40–70%) and quartz (20–50%) having about a 1:1 ratio of $CaO:SiO_2$ and a $TiO_2$ content of 0.2 to 3%. The marl is first roasted at a temperature below its melting phase (700–900° C.) and crushed to a grain size of 4 to 6 mm. 4–8% by weight of portland cement, lime or hydraulic lime is added before hardening to give increased compression strength to the final construction material.

BACKGROUND OF THE INVENTION

This invention relates to an improved process for the hydrothermal production of mineral construction materials.

In general, the hydrothermal production of materials such as sandy limestones, light sandy limestones, light lime concrete and lime cinder blocks, is known. In the usual process for the manufacture of such materials caustic lime, calcium hydroxide, lime carbide, hydraulic lime or portland cement is mixed in a steel autoclave with sand and gravel as well as natural or artificial puzzolana such as fly-ash, slag, melting slag, calcined clay and marl; that is to say such substances obtained in thermal, including geothermal, process where a part is present as a so-called glass or melting phase. The mixture is heated to a very high temperature whereby the quartz component is converted into silicic acid which when calcined with the lime, which is present in the mixture, forms calcium silicate and ultimately calcium silicate hydroxide which acts as a binder in the resulting construction materials.

It has likewise been known that artificial puzzolana may be produced with latent hydraulic characteristics through the burning of lime together with natural substances, e.g. marl or oil shale. Such puzzolana are likewise suitable for the production of hydrothermally fabricated construction materials and construction parts.

Construction materials produced according to the above mentioned processes of the prior art are either heavy construction materials which are lightened by drilling holes into the molded parts or they are light construction materials in which a high pore volume is achieved through the use of foaming or leavening agents.

SUMMARY OF THE INVENTION

Accordingly, an object of the present invention is the formation of artificial puzzolana particularly suited for the hydrothermal production of building materials.

It is a further object of the present invention to provide hydrothermal hardened building material having great strength and low volumetric weight.

These and other objects of the present invention are realized in a process which comprises roasting marl at a temperature below that necessary for the formation of a melting phase and crushing the roasted material to a grain size of between about 4 to 6 mm. The resulting material is then mixed with lime and sand or gravel and subjected to a hydrothermal treatment to produce the intended material.

DETAILED DESCRIPTION OF THE INVENTION

By means of the present invention a thermally activated earth may be mixed with water and formed into construction materials of high strength and low volumetric weight. This thermally activated earth may be referred to as "roasted clay" which, as used in the specification and claims, is defined as a mixture of a marl along with lime, containing brickyard clays and sandstones in loose form, said mixture having been calcined by roasting at a temperature below that effecting a glass of melting phase. Generally such roasting will take place at a temperature within the range 700 to 900° C. The "roasted clay" is crushed to a grain size of 4 to 6 mm. after which it may be mixed with water and subjected to hydrothermal hardening treatment to produce the intended commercial product.

The present invention is to be distinguished from the "burning" or marl and oil shale which produces the conventional puzzolana resulting in the manufacture of the heavier and weaker construction material previously known.

Conventional natural puzzolana such as trass, pumice and trachyte as well as artificial puzzolana including numerous combustion and metallurgical slags, hard coal fly ash, crushed bricks, ash from oil shale, etc. have a characteristic unstable glass phase through which reactivation is brought. Such substances have some latently hydraulic properties but generally so little that they have to be activated by prolonged grinding or treated in a quenching autoclave.

In the roasting operation of the present invention highly active decomposition products of the clay minerals and of the silicic acid hydroxides as well as of the amorphous silicic acid present therein are developed, from which building materials of great strength are produced during the hydrothermal hardening.

In addition, calcium aluminate hydroxides are also developed which are also effective in producing the intended product.

It is advantageous if during roasting, at least 25% of the calcium carbonate present in the marl will not be decomposed, that is to say if the residual loss on ignition, in relation to the calcium carbonate share in the marl, amounts to at least 10%.

In addition to the above, it has also been discovered that characteristics of these substances can be improved essentially, if more than 0.2%, preferably 0.5 to 3%, by weight of titanium dioxide is present in the marl either as an accessory portion in the starting substance or added to the starting material. Such use of titanium dioxide has shown marked effectiveness within the temperature range of 800 to 900° C.

In the absence of indications to the contrary, all proportions and concentration of materials are expressed on a weight basis.

The following example will further illustrate the invention.

EXAMPLE 1

A mineral substance substantially comprising marl having the following analysis:

| | Percent by weight |
|---|---|
| Calcium carbonate | 10 |
| Clay mineral | 70 |
| Quartz carriers (sand, silt) | 20 | and a $TiO_2$ content of about 0.5 was roasted at 800° C. for approximately 3 hours and afterwards crushed and shaped by customary hardening in an autoclave at about 165° C. at one atmosphere for about 65 hours. The resulting materials were tested and shown to have strengths within the range of from 200 to 250 kp./cm.$^2$. Jigged into steel dies as a hydrous casting mass, without the addition of a binder, and subsequently treated in the autoclave, construction parts with a compression strength of 100 to 150 kp./cm.$^2$ were achieved. Through a small addition of a binder, for example, about 4% portland cement, in relation to the quantity of "roasted clay," the compression strength was raised up to 330 kp./cm.$^2$. As compared to a normal standard concrete of the same strength, the binder requirement is thus twice to two and a half times less in the case of "roasted clay." Therefore, it seems apparent that roasting of natural and artificial marls, effects considerably different results. This result may be attributed to the fact that there is no formation of a melting phase in the presence of titanium dioxide as compared to the known processes, wherein the marl is calcined in a shaft or rotary furnace, which, necessarily forms a hydraulic lime or even a synthetic puzzolana with a varying portion of the glass or melting phase.

The marl preferably is composed of Molasse-sandstone or synthetic mixtures derived from lime water, loam and silt with the following preferred composition:

| | |
|---|---|
| Calcium carbonate | Between about 10 to 30% by weight. |
| Clay mineral | Between about 40 to 70% by weight. |
| Quartz carriers (sand, silt) | Between about 20 to 50% by weight. | with a $TiO_2$ optimum content of about 0.5 to 1% by weight.

Preferably the construction materials are hardened in an autoclave above 165° C., and preferably at 180–210° C. for about 65 atm. hours; i.e., pressure in atmospheres × number of hours = 65.

A particular advantage of the present invention is the fact that molded bodies produced from roasted clay are suitable not only for reinforced or non-reinforced, but also of prestressed construction parts. In the case of reinforced construction parts, according to experience, frequently damage has occurred in the past (formation of cracks) because of the differing expansion coefficients of steel and of the construction material during hardening in the autoclave.

A further advantage is seen in the fact that from such roasted substances one can produce molded bodies after roasting and crushing, with or without reinforcement, by pressing, stamping, shaping or casting, which will bind sufficiently prior to the hydrothermal treatment, so that they can be transported easily. They will, of course, receive their final great strength in the autoclave.

What we claim is:

1. A process for producing thermally activated earth for use in construction materials which comprises roasting marl composed by weight of about 10 to 30% calcium carbonate, 40 to 70% clay minerals, 20 to 50% quartz and 0.5 to 3% titanium dioxide at a temperature of from 800° to 900° C. and below that forming a melt phase for a time sufficient that residual loss on ignition of the calcium carbonate portion of the roasted marl is at least 10%, and crushing said roasted marl to a maximum grain size of 4 to 6 mm.

2. A process as defined in claim 1 wherein said marl has a 1:1 ratio of $CaO:SiO_2$.

References Cited

UNITED STATES PATENTS

| | | | |
|---|---|---|---|
| 2,569,323 | 9/1951 | Maynard | 264—43 |
| 2,699,409 | 1/1955 | Hashimoto | 264—43 |
| 2,987,411 | 6/1961 | Minnick | 264—43 |
| 1,664,689 | 4/1928 | Kern | 264—44 |
| 1,707,395 | 4/1929 | Hayde | 264—44 |

FOREIGN PATENTS

| | | | |
|---|---|---|---|
| 149,440 | 8/1920 | Great Britain | 264—44 |

OTHER REFERENCES

A. E. Dodd, "Dictionary of Ceramics," 1964, Philosophical Library Inc., New York, pp. 101, 156, 175.

E. C. Eckel, "Cements, Limes and Plasters," 1st edition, 1905, John Wiley & Sons, New York, pp. 340–343.

A. B. Searle, "Encyclopedia of the Ceramic Industries," vol. 2, 1930, Ernest Benn, Ltd., London, pp. 299–300.

F. H. Norton, "Refractories," 3rd edition, 1949, McGraw-Hill Book Company, Inc., New York, p. 183.

DONALD J. ARNOLD, Primary Examiner

J. H. MILLER, Assistant Examiner

U.S. Cl. X.R.

263—53